(12) United States Patent
Anesko et al.

(10) Patent No.: US 7,145,908 B1
(45) Date of Patent: Dec. 5, 2006

(54) SYSTEM AND METHOD FOR REDUCING JITTER IN A PACKET TRANSPORT SYSTEM

(75) Inventors: Alexander Anesko, Brunswick, ME (US); Douglas M. Brinthaupt, Holmdel, NJ (US); Mourad Takla, Basking Ridge, NJ (US)

(73) Assignee: Agere Systems Inc., Allentown, PA (US)

( * ) Notice: Subject to any disclaimer, the term of this patent is extended or adjusted under 35 U.S.C. 154(b) by 1186 days.

(21) Appl. No.: 09/648,996

(22) Filed: Aug. 28, 2000

(51) Int. Cl.
*H04L 12/28* (2006.01)
*H04L 12/56* (2006.01)
*H04J 3/24* (2006.01)
*H04J 3/06* (2006.01)

(52) U.S. Cl. ............... 370/395.1; 370/474; 370/516; 370/517

(58) Field of Classification Search ............ 370/516, 370/517, 395.1, 474; 375/371, 372
See application file for complete search history.

(56) References Cited

U.S. PATENT DOCUMENTS

| 5,608,733 | A | * | 3/1997 | Vallee et al. | 370/394 |
|---|---|---|---|---|---|
| 5,663,959 | A | * | 9/1997 | Nakagawa | 370/236.2 |
| 5,751,695 | A | * | 5/1998 | Ohashi | 370/218 |
| 5,872,789 | A | * | 2/1999 | Orleth et al. | 370/517 |
| 5,875,192 | A | * | 2/1999 | Cam et al. | 370/395.7 |
| 5,970,067 | A | * | 10/1999 | Sathe et al. | 370/394 |
| 6,002,670 | A | * | 12/1999 | Rahman et al. | 370/238 |
| 6,134,246 | A | * | 10/2000 | Cai et al. | 370/474 |
| 6,148,001 | A | * | 11/2000 | Soirinsuo et al. | 370/395.4 |
| 6,205,142 | B1 | * | 3/2001 | Vallee | 370/394 |
| 6,222,858 | B1 | * | 4/2001 | Counterman | 370/474 |
| 6,418,120 | B1 | * | 7/2002 | Yona et al. | 370/236 |
| 6,678,275 | B1 | * | 1/2004 | DeGrandpre et al. | 370/395.7 |
| 6,813,275 | B1 | * | 11/2004 | Sharma et al. | 370/412 |
| 6,894,977 | B1 | * | 5/2005 | Vallee | 370/236.2 |

OTHER PUBLICATIONS

Inverse Multiplexing for ATM (IMA) Specification, Version 1.0, The ATM Forum Technical Committee, Jul. 1997.*
"Multirate Systems and Filter Banks," by P. P. Vaidyanathan, Prentice Hall Signal Processing Series, Chap. 5, Section 5.3, pp. 211-213, Jul. 1992.

* cited by examiner

*Primary Examiner*—Huy D. Vu
*Assistant Examiner*—Blanche Wong

(57) ABSTRACT

A system and method for reducing jitter in a packet transport system. In one embodiment, the system includes (1) a cell status subsystem that determines whether a cell is a data cell or a control cell; and (2) a cell reader, coupled to the cell status subsystem, that reads the cell if the cell is a data cell and skips the cell if the cell is a control cell.

15 Claims, 4 Drawing Sheets

SYSTEM AND METHOD FOR REDUCING JITTER IN A PACKET TRANSPORT SYSTEM

TECHNICAL FIELD OF THE INVENTION

The present invention is directed, in general, to packet transport systems and, more specifically, to a system and method for reducing jitter in a packet transport system.

BACKGROUND OF THE INVENTION

Packet transport systems, such as Asynchronous Transfer Mode (ATM) systems, employ a technique of disassembling information at a sending end of a switching network for insertion into separate packets of data and reassembling the same information from the data packets at a receiving end of the switching network. Communication systems employing this technique are especially useful in common carrier or time-shared switching networks, since a communication path or circuit required for packet transmission is needed only while each packet is being forwarded through the switching network. The communication path is, therefore, available to other users during intervening periods.

Packet transport systems are capable of providing integrated information transport services for a wide range of applications (e.g., interactive data, bulk data, signaling, packetized voice, image). Instead of designing specialized networks optimized for specific applications, many services can be simultaneously operated over the same connection to the switching network. User information of varying types are converted into packets, the switching network transporting these packets between users. End users are not tied to fixed rate connections. Instead, the switching network adapts the connection rates to the particular needs of the end users. Furthermore, it is possible to create a uniform user-network interface that is applicable to a broad range of services.

ATM systems are commonly employed within a Wide Area Networks (WANs) and have seen increasing use in both public carrier networks and in private networks, especially those requiring networked voice, video and data traffic. As the organizations require greater WAN access to support higher volumes of traffic, however, the organizations are faced with either paying for the high cost of T3/E3 access lines, which they may not be able to fully utilize, or adding more T1/E1 access lines, thereby creating multiple parallel networks.

Inverse Multiplexing over ATM (IMA) offers one solution to this dilemma. IMA is a User-to-Network Interface (UNI) standard that provides flexibility for ATM based systems. IMA specifies a transmission method in which cells in ATM cell streams are distributed over multiple T1/E1 access lines or physical links. Each link is typically a standard T1/E1 ATM UNI. IMA involves inverse multiplexing and de-multiplexing of ATM cells in a cyclical fashion among links grouped together to form a higher bandwidth logical link (virtual link) having a rate that is approximately a sum of the individual link rates. IMA thus allows network planners to provide bandwidth in T1/E1 increments, increasing or decreasing bandwidth based on user requirements.

IMA devices terminate at each end of the IMA virtual link. At a transmitting IMA device, the ATM cell stream received from the ATM layer is distributed on a cell by cell basis, across the multiple links. At a receiving IMA device, the cells from each of the multiple links are recombined, on a cell by cell basis, thus recreating the original ATM cell stream. The ATM cell stream is then passed on to the ATM layer.

The IMA standard provides for periodic transmission of IMA Control Protocol (ICP) cells, which contain control information for reconstructing the ATM cell stream at a receiving end of the IMA virtual link. The ICP cells provide the definition for the IMA frame. The transmitting IMA device is required to align the IMA frames on all of the links, allowing the receiving IMA device to adjust for differential link delays among the various links forming the virtual link. The receiving IMA device may thus detect differential delays by measuring arrival times of the IMA frames on each link.

A problem arises when the receiving IMA device reads multiple links, each having ICP cells at the same offset from the beginning of the frame (ICP offset). The IMA standard requires that the ICP cells be read and discarded without affecting the timing of the presentation of the ATM cells (data cells) to the ATM layer. Assume, for example, an IMA group consisting of Q links, of which P links (where $1<P \leq Q$) have the same ICP offset. If it takes Y cycles to read the link parameters and decide whether the current cell is an ICP cell, and it takes X cycles to read a cell pointer, then $(P+1)(X+Y)$ cycles will be required to read the next data cell. This delay in reading the next data cell results in jitter in relation to the time at which the data cell is presented to the ATM layer.

One way to reduce the jitter is to prevent ICP cells from being located at the same ICP offset. While this method appears to be a straightforward solution, it does not provide enough flexibility. For instance, while the links may initially be configured such that the ICP cells are not located at the same ICP offset, repeated reconfiguration of the links may ultimately result in a number of links having the same ICP offset.

Accordingly, what is needed in the art is a system and method for reducing jitter in a packet transport system that overcomes the deficiencies of the prior art.

SUMMARY OF THE INVENTION

To address the above-discussed deficiencies of the prior art, the present invention provides a system and method for reducing jitter in a packet transport system. In one illustrative embodiment, the system for reducing jitter includes (1) a cell status subsystem that determines whether a cell is a data cell or a control cell; and (2) a cell reader, coupled to the cell status subsystem, that reads the cell if the cell is a data cell and skips the cell if the cell is a control cell.

Another embodiment of the present invention provides for a system and method for reducing jitter in an Inverse Multiplexing over Asynchronous Transfer Mode (IMA) system. In an illustrative embodiment, the system for reducing jitter includes (1) a cell status subsystem that determines whether a cell is a data cell or an IMA Control Protocol (ICP) cell; and (2) a cell reader, coupled to the cell status subsystem, that reads the cell if the cell is a data cell and skips the cell if the cell is an ICP cell.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
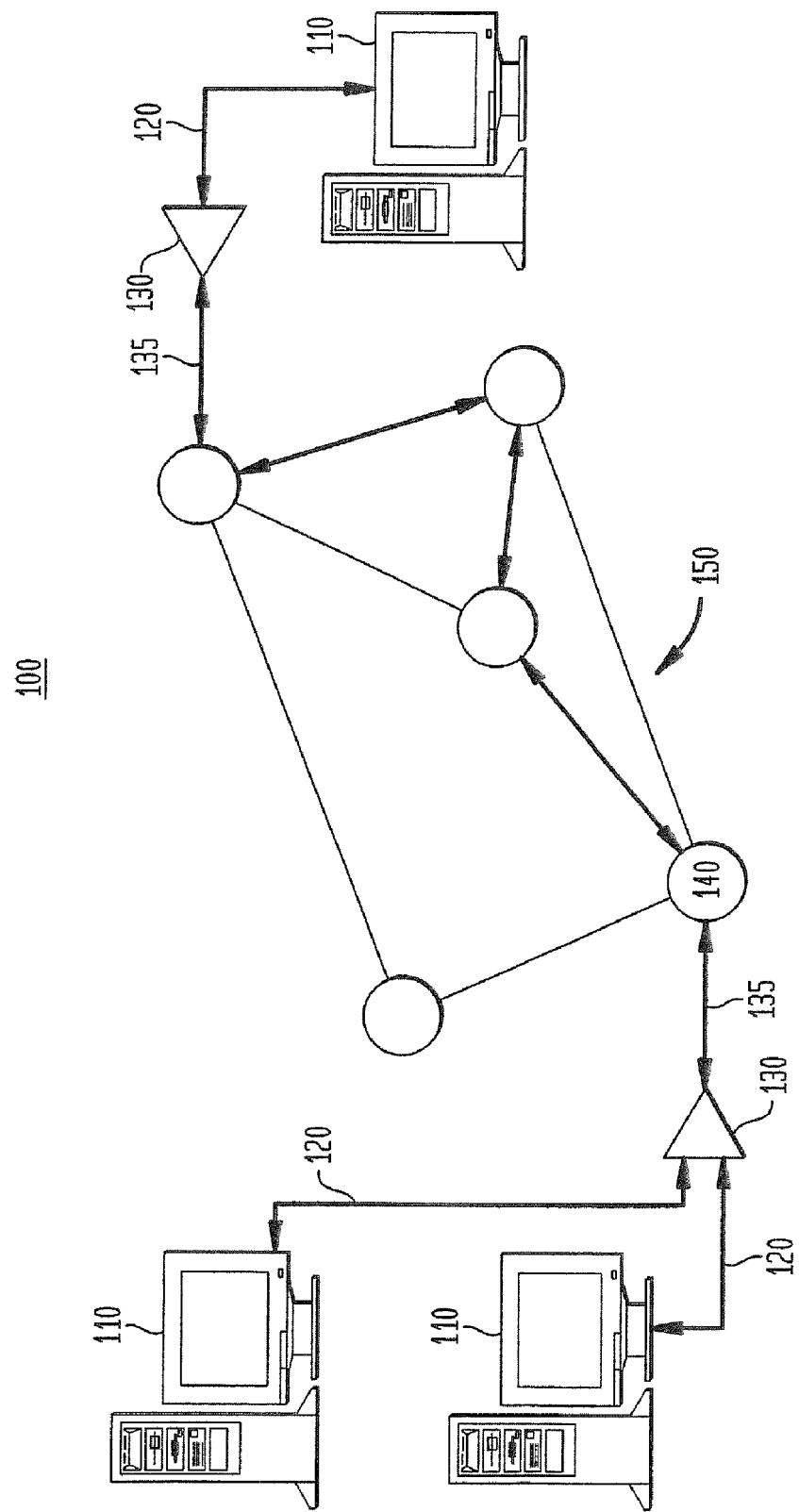
FIG. 1 illustrates a block diagram of an embodiment of a packet switching network that provides an environment for the present invention.

Referring initially to FIG. 1, illustrated is a block diagram of an embodiment of a packet switching network 100 that provides an environment for the present invention. The packet switching network 100 is arranged for establishing virtual circuit connections between terminal equipment, generally designated 110. The terminal equipment 110 transmit packets of data (containing information such as packetized voice) through connection lines, generally designated 120, to a packet multiplexer, generally designated 130. While the terminal equipment 110 are illustrated as computer terminals, those skilled in the art understand that the terminal equipment 110 may include any devices capable of operating with digitized voice, video or data.

A resulting output stream of packets, interspersed with one another, are transmitted from the packet multiplexer 130 over an access line (generally designated 135) to a node (one of which is designated 140) of the packet switching network 100. Other links (one of which is designated 150) also transmit streams of data packets into the node 140. Some of these links 150 may originate at a multiplexer (such as the packet multiplexer 130), while others may originate at high speed terminal equipment. The packet switching network 100 typically includes a large number of nodes 140, interconnected via a large number of links 150.

Illustrated is an exemplary virtual connection, shown by a heavily weighed path line linking one of the terminal equipment 110 to another of the terminal equipment 110. Transmission is typically bidirectional over such a virtual connection.

Figure 2:
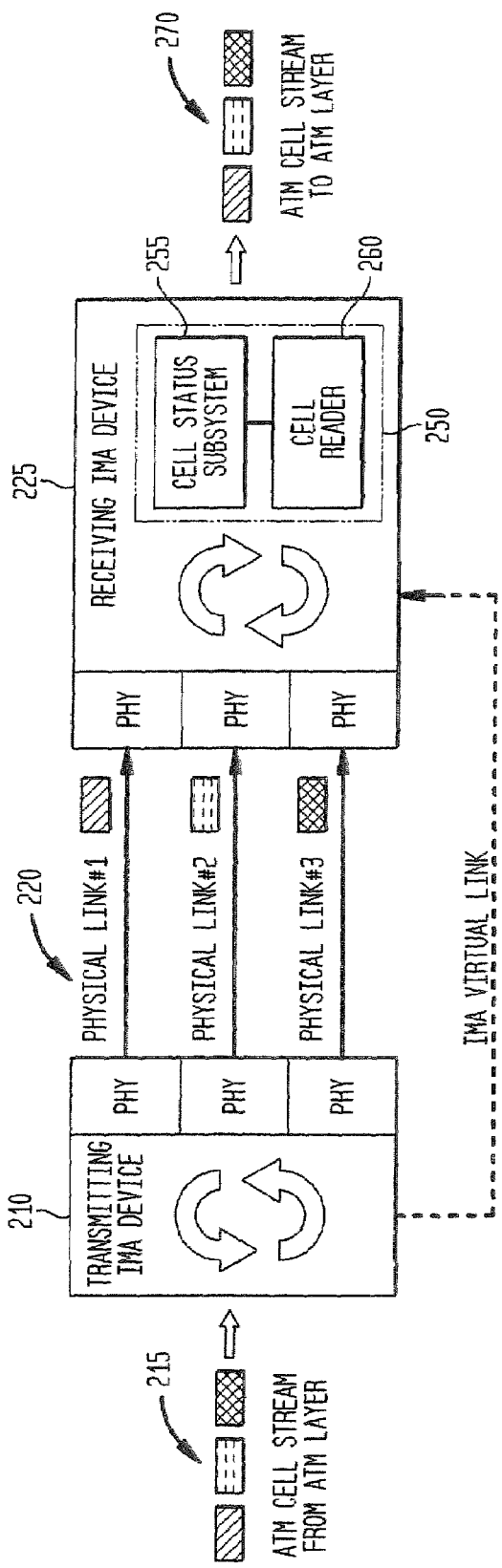
FIG. 2 illustrates a block diagram of an embodiment of an Inverse Multiplexing over Asynchronous Transfer Mode (IMA) system constructed in accordance with the principles of the present invention.

Turning now to FIG. 2, illustrated is a block diagram of an embodiment of a packet transport system constructed in accordance with the principles of the present invention. In the illustrated embodiment, the packet transport system is an Inverse Multiplexing over Asynchronous Transfer Mode (IMA) system 200. Of course, the principles of the present invention are also applicable to other packet transports systems.

The IMA system 200 includes a transmitting IMA device 210 that receives an (Asynchronous Transfer Mode) ATM cell stream 215 (having a plurality of cells) from an ATM layer and distributes the cells across a plurality of physical links (one of which is designated 220). The IMA system 200 further includes a receiving IMA device 225 coupled to the plurality of physical links 220. The receiving IMA device 225 recombines the cells from each of the plurality of physical links 220 and provides the cells to the ATM layer in the form of another ATM cell stream 270. The IMA system 200 thus forms a virtual link for carrying the ATM cell stream.

The IMA system 200 should ideally provide the cells to the ATM layer at an IMA Data Cell Rate (IDCR), which is determined by an IMA Data Cell Clock (IDCC). Because the physical links 220 carry not only data cells, but also control cells (e.g., IMA Control Protocol (ICP) cells), the receiving IMA device 225 is required to read and discard the ICP cells without introducing substantial delay to the presentation of the data cells to the ATM layer. A problem arises when the receiving IMA device 225 reads a number of contiguous links, each having ICP cells at the same offset from the beginning of the frame (ICP offset or, generically, a control offset). The amount of time required to read and discard a number of ICP cells (one from each of the links having ICP cells at the same ICP offset) may be excessive, resulting in an unacceptable delay to the time at which the next data cell is presented to the ATM layer. This delay between the presentation of one data cell to the ATM layer and the presentation of the next data cell to the ATM layer is commonly referred to as jitter.

The present invention, therefore, introduces a system for reducing jitter 250 in the cell stream 270 in the IMA system 200. In the illustrated embodiment, the system for reducing jitter 250 includes a cell status subsystem 255 that determines whether a cell is a data cell or an ICP cell. The system for reducing jitter 250 further includes a cell reader 260 coupled to the cell status subsystem 255. The cell reader 260 reads the cell if the cell is a data cell and skips the cell if the cell is an ICP cell. The system for reducing jitter 250 may therefore reduce jitter in the time at which the data cells are provided to the ATM layer. The operation of the system for reducing jitter 250 will be described in more detail with respect to FIG. 3.

Each of the cell status subsystem 255 and the cell reader 260 may be embodied in software, firmware, hardware, dedicated or hardwired discrete or integrated circuitry or any combination thereof. Further, each of the cell status subsystem 255 and the cell reader 260 may be implemented within the receiving IMA device 225 or may be implemented in a system couplable to the receiving IMA device. Of course, other implementations of the cell status subsystem 255 and the cell reader 260 are well within the broad scope of the present invention.

Figure 3A:
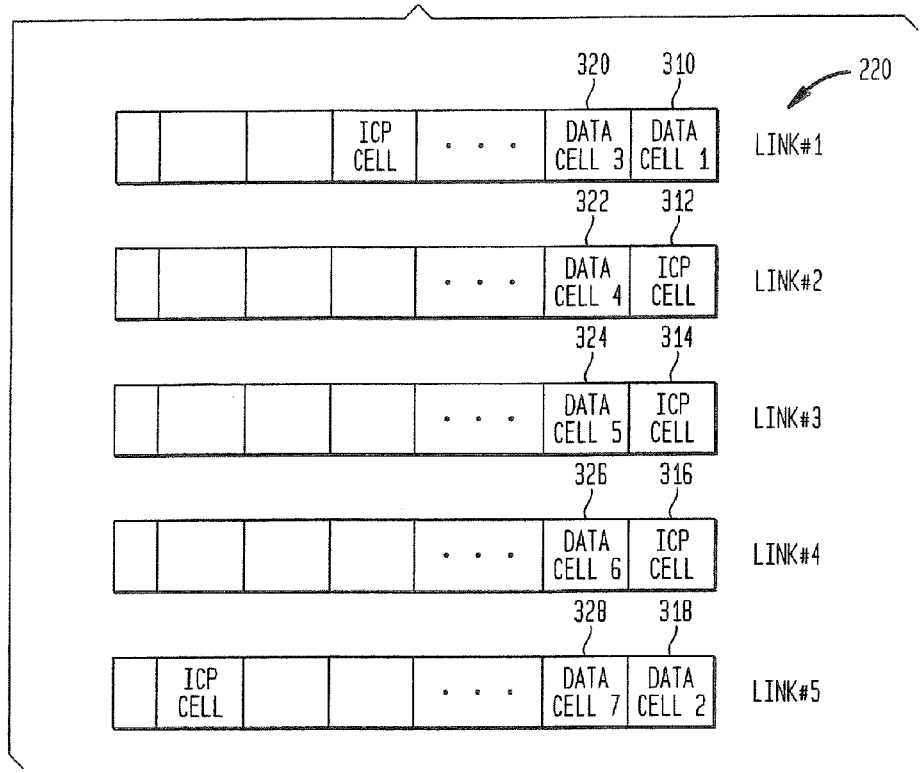
FIG. 3A illustrates a block diagram of an embodiment of various links of an IMA system detailing data cells and IMA Control Protocol (ICP) cells contained therein.

Turning now to FIG. 3A, illustrated is a block diagram of an embodiment of various links (physical link 220) of the IMA system 200 illustrated and described with respect to FIG. 2, detailing data cells and IMA Control Protocol (ICP) cells contained therein. A first link (Link #1) is illustrated as containing Data Cell 1 in a first position, and Data Cell 3 in a second position. A second link (Link #2) is illustrated as containing an ICP cell in the first position, and Data Cell 4 in the second position. A third link (Link #3) is illustrated as containing an ICP cell in the first position, and Data Cell 5 in the second position. A fourth link (Link #4) is illustrated as containing an ICP cell in the first position, and Data Cell 6 in the second position. A fifth link (Link #5) is illustrated as containing Data Cell 2 in the first position, and Data Cell 7 in the second position. The second, third and fourth links (Link #2, Link #3, Link #4) thus have ICP cells in the same position (i.e., at the same ICP offset).

While the IMA standard does not suggest having a number of ICP cells at the same ICP offset, in practice, this may not be possible. For instance, while the various links may initially be configured such that the ICP cells are not at the same ICP offset, repeated reconfiguration of the links, as various links are brought up and down, may ultimately result in a situation depicted in FIG. 3A, where a number of contiguous links have ICP cells at the same offset.

Figure 3B:
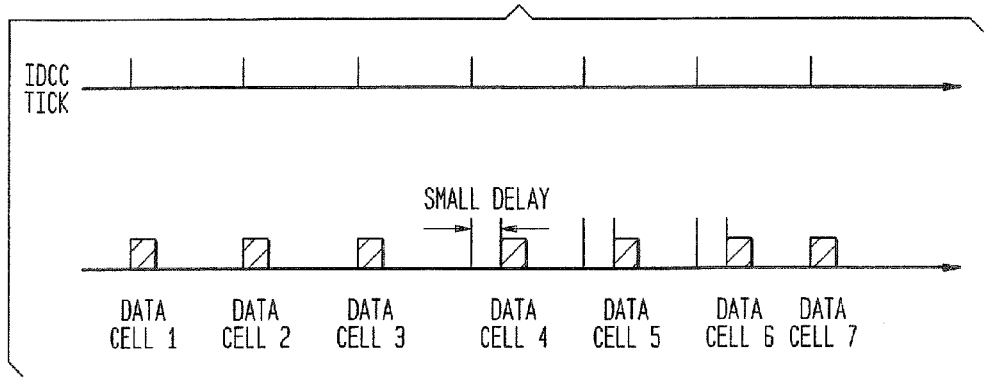
FIG. 3B illustrates a timing diagram showing data cells being provided to the ATM layer in accordance with the principles of the present invention.

Turning now to FIG. 3B, illustrated is a timing diagram showing data cells being provided to the ATM layer in accordance with the principles of the present invention. Data Cell 1, Data Cell 2, Data Cell 3 and Data Cell 7 are presented to the ATM layer substantially with the IDCC tick, while Data Cell 4, Data Cell 5, Data Cell 6 are presented to the ATM layer after a small delay caused by the reading and discarding of the respective ICP cells.

The operation of the system for reducing jitter 250 of FIG. 2 will now be described with continuing reference to FIG. 2, FIG. 3A and FIG. 3B. The receiving IMA device 225 addresses the physical links 220 in a round-robin fashion. First, the cell status subsystem 255 determines whether a first cell 310 of the first link (Link #1) is a data cell or an ICP cell. One way of making this determination is to compare a frame offset of the first cell 310 to an ICP offset associated with the first link (Link #1). In this case, the frame offset of the first cell 310 is not equal to an ICP offset associated with the first link (Link #1). The cell status subsystem 255 therefore determines that the first cell 310 is a data cell (Data Cell 1) and not an ICP cell. The cell status subsystem 255 then determines whether the first cell 310 is a data cell following an ICP cell. Assuming for the sake of this example, that the first cell 310 is not a data cell following an ICP cell, the cell reader 260 then reads the first cell 310 and provides the data cell (Data Cell 1) to the ATM layer. A link number associated with the first link (Link #1) is then incremented, positioning the system for processing a cell from a first position of the second link (Link #2).

The cell status subsystem 255 now determines whether a second cell 312 of the second link (Link #2) is a data cell or an ICP cell. In this case, the second cell 312 is an ICP cell. The cell reader 260 does not read the second cell 312 at this time (i.e., the ICP cell is skipped). A link number associated with the second link (Link #2) is then incremented, positioning the system for processing a cell from a first position of the third link (Link #3).

The cell status subsystem 255 continues with a third cell 314 and a fourth cell 316 of the third and fourth links (Link #3, Link #4), respectively. Since the third and fourth cells 314, 316 are ICP cells, the cell reader 260 does not read the third and fourth cells 314, 316 at this time. Each time, the link number is incremented accordingly, until the system reaches a fifth cell 318.

The cell status subsystem 255 determines whether the fifth cell 318 of the fifth link (Link #5) is a data cell. In this case, the fifth cell 318 is a data cell (Data Cell 2). The cell status subsystem 255 then proceeds to determine whether the fifth cell 318 is a data cell following an ICP cell. Assuming that the fifth cell 318 is not a data cell following an ICP cell but, rather, is an ordinary data cell, the cell reader 260 then reads the fifth cell 318 and provides the fifth cell 318 to the ATM layer. A link number associated with the fifth link (Link #5) is then incremented, positioning the system for processing a cell from a second position of the first link (Link #1).

Again, the cell status subsystem 255 determines whether a sixth cell 320 of the first link (Link #1) is a data cell or an ICP cell. In this case, the sixth cell 320 is a data cell (Data Cell 3). The cell status subsystem 255 then determines whether the sixth cell 320 is a data cell following an ICP cell. In this case, the sixth cell 320 is an ordinary data cell (Data Cell 3) and not a data cell following an ICP cell. The cell reader 260 thus reads the sixth cell 320 and provides the data cell to the ATM layer. A link number associated with the first link (Link #1) is then incremented, positioning the system for processing a cell from a second position of the second link (Link #2).

The cell status subsystem 255 now determines whether a seventh cell 322 of the second link (Link #2) is a data cell or an ICP cell. In this case, the seventh cell 322 is a data cell (Data Cell 4). The cell status subsystem 255 then determines whether the seventh cell 322 is a data cell following an ICP cell. In this case, the seventh cell 322 is a data cell following an ICP cell. The cell reader 260 thus reads and discards the ICP cell, which is in the first position of the second link (Link #2). The cell reader 260 then reads the data cell (Data Cell 4) and provides the data cell to the ATM layer. A link number associated with the second link (Link #2) is then incremented, positioning the system for processing a cell from a second position of the third link (Link #3).

The cell status subsystem 255 determines that an eighth cell 324 of the third link (Link #3) is a data cell (Data Cell 5) following an ICP cell. The cell reader 260 reads and discards the ICP cell from the third link (Link #3), then reads the data cell (Data Cell 5) from the third link (Link #3) and provides the data cell (Data Cell 5) to the ATM layer. The link number is then incremented, positioning the system for processing a cell from the fourth link (Link #4). Again, since a ninth cell 326 of the fourth link (Link #4) is a data cell (Data Cell 6) following an ICP cell, the cell reader 260 reads and discards the ICP cell from the fourth link (Link #4), then reads the data cell (Data Cell 6) from the fourth link (Link #4) and provides the data cell to the ATM layer. The link number is incremented again, positioning the system for processing a cell from the fifth link (Link #5).

The cell status subsystem 255 now determines whether a tenth cell 328 of the fifth link (Link #5) is a data cell or an ICP cell. In this case, the tenth cell 328 is a data cell (Data Cell 7). The cell status subsystem 255 then determines whether the tenth cell 328 is a data cell following an ICP cell. In this case, the tenth cell 328 is an ordinary data cell (Data Cell 7) and not a data cell following an ICP cell. The cell reader 260 thus reads the tenth cell 328 and provides the data cell (Data Cell 7) to the ATM layer. A link number associated with the fifth link (Link #5) is then incremented, positioning the system for processing a cell from a third position of the first link (Link #1). The system for reducing jitter 250 thus advantageously distributes the delays resulting from reading the ICP cells over a period of time, thereby reducing the jitter associated with any particular data cell.

Figure 4:
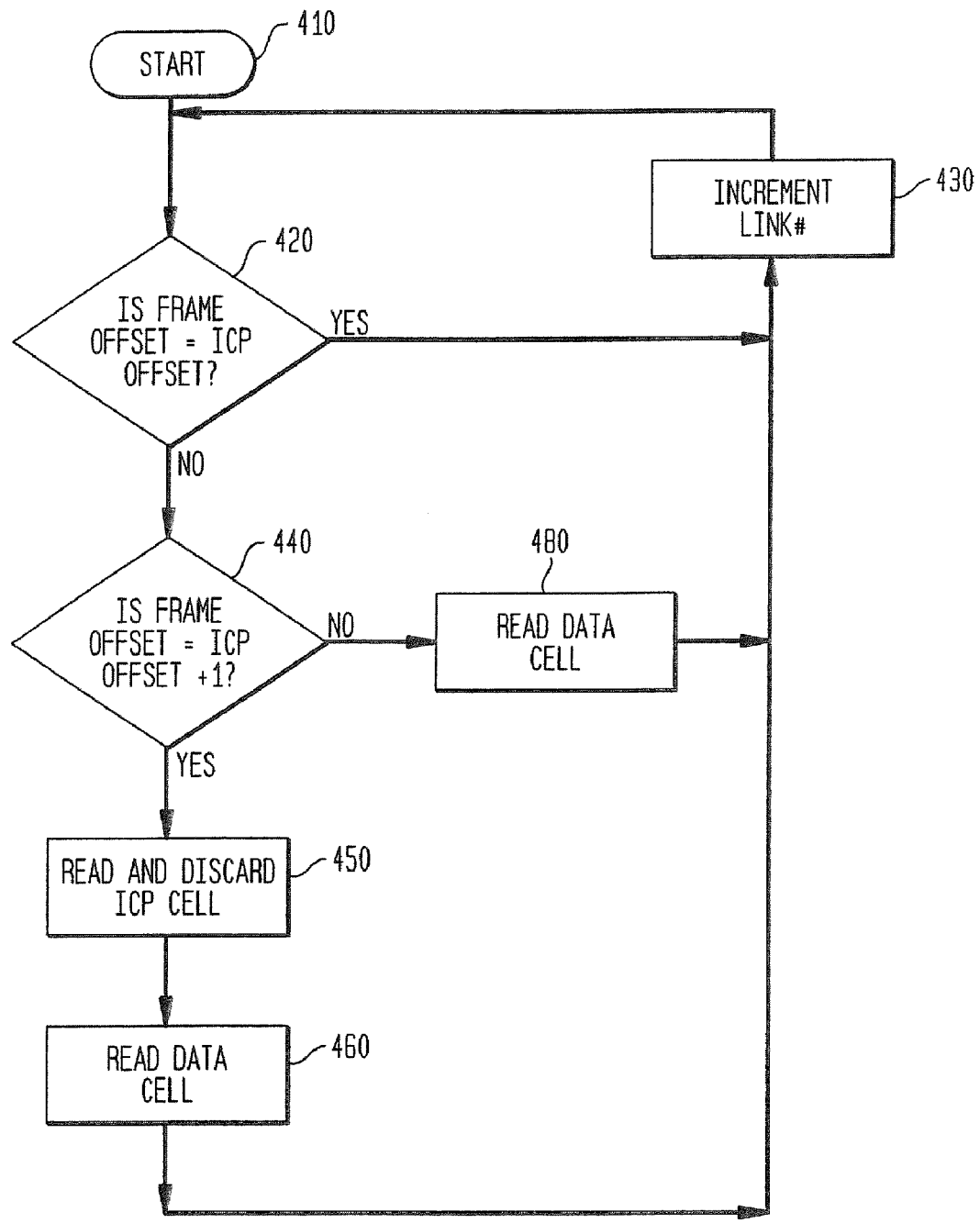
FIG. 4 illustrates a flow diagram of an embodiment of a method of reducing jitter in accordance with the principles of the present invention.

Turning now to FIG. 4, illustrated is a flow diagram of an embodiment of a method of reducing jitter in accordance with the principles of the present invention. The method begins at a start step 410. At a first decision step 420, it is determined whether a current cell (of a current link) is a data cell or an ICP cell. The determination may be performed by comparing a frame offset of the cell to an ICP offset. If the frame offset is equal to the ICP offset, then the cell is an ICP cell. The link number associated with the cell (and the IMA system, in general) is then incremented in an Increment Link# step 430. The method then repeats the first decision step 420 with respect to a next link. For example, if the current link is Link #1, the next link (after the Increment Link# step 430) will be Link #2. The ICP cell in the current link is thus skipped.

If the frame offset is not equal to the ICP offset, then the cell is a data cell and the method continues to a second decision step 440. The second decision step 440 determines whether the cell is a data cell following an ICP cell. The determination may be performed by comparing a frame offset of the cell to one more than an ICP offset (i.e., ICP offset+1). If the frame offset is equal to one more than the ICP offset, then the cell is a data cell following an ICP cell. In this case, the method continues to a Read and Discard ICP Cell step 450, where the ICP cell (which was skipped before) is read. The method then continues to a first Read Data Cell step 460, wherein the data cell following the ICP cell is read. The link number associated with the ICP cell and the data cell (and the IMA system, in general) is then incremented in the Increment Link# step 430. The method then repeats the first decision step 420 with respect to the next link.

If the frame offset is not equal to one more than the ICP offset, then the cell is an ordinary data cell. The method continues to a second Read Data Cell step 480, wherein the data cell is read. The link number associated with the data cell (and the IMA system, in general) is then incremented in the Increment Link# step 430. The method then repeats the first decision step 420 with respect to the next link.

Those skilled in the art should understand that the previously described embodiment of the system and method for reducing jitter are submitted for illustrative purposes only and other embodiments are well within the broad scope of the present invention. For instance, while the illustrative embodiments of FIGS. 2, 3 and 4 have been illustrated and described as being embodied in an IMA system, those skilled in the art realize that the principles of the present invention are applicable to any type of packet transport system that suffers from jitter caused by reading a number of control cells at the same control offset.

Although the present invention has been described in detail, those skilled in the art should understand that they can make various changes, substitutions and alterations herein without departing from the spirit and scope of the invention in its broadest form.

What is claimed is:

1. A system for reducing jitter in an Inverse Multiplexing over Asynchronous Transfer Mode (IMA) system, comprising:
    a cell status subsystem that determines whether a cell is a data cell or an IMA Control Protocol (ICP) cell and whether a cell is a data cell following an ICP cell; and
    a cell reader, coupled to said cell status subsystem, that reads said cell if said cell is a data cell and skips said cell if said cell is an ICP cell, said cell reader further reading said ICP cell, discarding said ICP cell, and reading said data cell if said data cell follows said ICP cell, wherein delays resulting from said reading said ICP cell and said discarding said ICP cell are distributed over a number of IMA Data Cell Clock (IDCC) ticks.

2. The system for reducing jitter as recited in claim 1 wherein said IMA system includes a plurality of links and said cell is associated with one of said plurality of links, said cell reader incrementing a link number associated with said IMA system.

3. The system for reducing jitter as recited in claim 1 wherein said cell status subsystem determines whether said cell is a data cell or an ICP cell by comparing a frame offset of said cell to an ICP offset.

4. The system for reducing jitter as recited in claim 3 wherein said cell is an ICP cell if said frame offset is equal to said ICP offset.

5. The system for reducing jitter as recited in claim 1 wherein said cell status subsystem determines whether said cell is a data cell following an ICP cell by comparing a frame offset of said cell to one more than an ICP offset.

6. A method of reducing jitter in an Inverse Multiplexing over Asynchronous Transfer Mode (IMA) system, comprising:
    determining whether a cell is a data cell or an IMA Control Protocol (ICP) cell;
    reading said cell if said cell is a data cell;
    skipping said cell if said cell is an ICP cell;
    determining whether a cell is a data cell following an ICP cell;
    if said data cell follows said ICP cell:
        reading said ICP cell,
        discarding said ICP cell, and
        reading said data cell; and
    distributing delays resulting from said reading said ICP cell and said discarding said ICP cell over a number of IMA Data Cell Clock (IDCC) ticks.

7. The method as recited in claim 6 wherein said IMA system includes a plurality of links and said cell is associated with one of said plurality of links, said method further comprising incrementing a link number associated with said IMA system.

8. The method as recited in claim 6 wherein said determining comprises comparing a frame offset of said cell to an ICP offset.

9. The method as recited in claim 8 wherein said cell is an ICP cell if said frame offset is equal to said ICP offset.

10. The method as recited in claim 6 wherein said determining whether said cell is a data cell following an ICP cell comprises comparing a frame offset of said cell to one more than an ICP offset.

11. An Inverse Multiplexing over Asynchronous Transfer Mode (IMA) system, comprising:
    a transmitting IMA device that receives cells from an Asynchronous Transfer Mode (ATM) layer and distributes said cells across a plurality of links;
    a receiving IMA device that recombines said cells from each of said plurality of links and provides said cells to said ATM layer, said receiving IMA device, including:
        a cell status subsystem that determines whether a cell associated with a particular link is a data cell or an IMA Control Protocol (ICP) cell and whether a cell is a data cell following an ICP cell, and
        a cell reader, coupled to said cell status subsystem, that reads said cell if said cell is a data cell and skips said cell if said cell is an ICP cell, said cell reader reading said ICP cell, discarding said ICP cell, and reading said data cell if said data cell follows said ICP cell, wherein delays resulting from said reading said ICP cell and said discarding said ICP cell are distributed over a number of IMA Data Cell Clock (IDCC) ticks.

12. The IMA system as recited in claim 11 wherein said cell reader increments a link number associated with said IMA system, thereby advancing to a next link of said plurality of links.

13. The IMA system as recited in claim 11 wherein said cell status subsystem determines whether said cell is a data cell or an ICP cell by comparing a frame offset of said cell to an ICP offset.

14. The IMA system as recited in claim 13 wherein said cell is an ICP cell if said frame offset is equal to said ICP offset.

15. The IMA system as recited in claim 11 wherein said cell status subsystem determines whether said cell is a data cell following an ICP cell by comparing a frame offset of said cell to one more than an ICP offset.

* * * * *